United States Patent [19]
Ota et al.

[11] 3,925,754
[45] Dec. 9, 1975

[54] MILEAGE WARNING SYSTEM

[75] Inventors: Nobuyoshi Ota; Hiroyuki Tashiro, both of Kariya, Japan

[73] Assignee: Nippondenso Co., Ltd., Kariya, Japan

[22] Filed: May 16, 1974

[21] Appl. No.: 470,661

[30] Foreign Application Priority Data
Sept. 14, 1973 Japan.......................... 48-107974[U]
Sept. 14, 1973 Japan.......................... 48-107981[U]

[52] U.S. Cl..................... 340/52 D; 340/56; 73/490
[51] Int. Cl.²........................................... B60Q 1/00
[58] Field of Search............ 340/52 D, 53, 56, 52 F, 340/62, 263; 73/489, 490, 495, 509, 510; 116/28, 29, 73

[56] References Cited
UNITED STATES PATENTS
1,815,206  7/1931  Mathews........................... 340/52 F

*Primary Examiner*—Alvin H. Waring
*Attorney, Agent, or Firm*—Cushman, Darby & Cushman

[57] ABSTRACT

There is provided a mileage warning system designed so that when the distance traveled by an automotive vehicle reaches a predetermined value, the driver is warned by a warning device, e.g., a lamp to perform the periodic checks, periodic replacement of parts or the like each time a predetermined distance has been traveled.

4 Claims, 11 Drawing Figures

MILEAGE WARNING SYSTEM

BACKGROUND OF THE INVENTION

1. Field of the Invention

The present invention relates to a system designed to give a warning when the distance traveled by an automotive vehicle reaches a predetermined value.

2. Description of the Prior Art

In the past, no system has been proposed which may meet the above-mentioned requirements, and there has existed a long felt need for such a system on the part of automobile drivers.

SUMMARY OF THE INVENTION

It is an object of the present invention to provide a mileage warning system so designed that each time a predetermined distance has been traveled a warning device comes into operation, and the warning device is so constructed that once the warning device has come into operation it is kept in operation until a reset switch is actuated, thereby very effectively calling upon the driver of a vehicle to perform the periodic checks, periodic replacement of parts or the like each time a predetermined distance has been traveled.

The mileage warning system according to this invention is highly advantageous from the standpoint of safety of automotive vehicles in that a warning is given each time a predetermined distance has been traveled by a vehicle to call upon the driver to make the periodic checks, periodic replacement of parts or the like in accordance with the distance traveled.

DESCRIPTION OF THE PREFERRED EMBODIMENT

The present invention will now be described in greater detail with reference to the illustrated embodiments.

Figure 1:
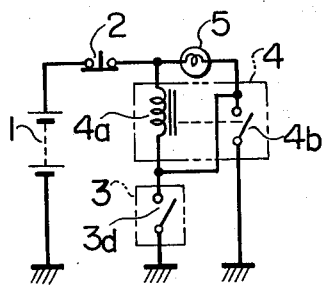
FIG. 1 is a circuit diagram showing a first embodiment of a mileage warning system according to the present invention.

Referring first to FIG. 1 showing a first embodiment of the invention, numeral 1 designates a battery installed in a vehicle which constitutes a power source, 2 a normally closed reset switch of the automatic restoring type which is installed as a hidden switch on the back side of an instrument panel, in a trunk or the like where it is not easily seen by the driver. Numeral 3 designates a detecting switch incorporated in a mileage detector A (see FIG. 4) which will be described later, 4 a self-holding type relay comprising a relay coil 4a and a relay contact 4b. Numeral 5 designates a lamp mounted on the instrument panel which constitutes a warning device.

Figure 2:
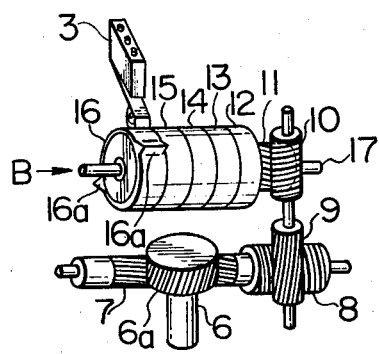
FIG. 2 is a perspective view showing an exemplary form of a mileage detector used with the system according to the first embodiment.
Figure 3:
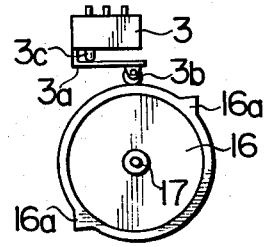
FIG. 3 is a partial side view of FIG. 2 viewed in the direction of an arrow B.

Now, the mileage detector A of the first embodiment including the detecting switch 3 of the above-mentioned type will be described with reference to FIGS. 2 through 4, in which numeral 6 designates a rotary shaft to which a rotational motion proportional to the number of revolutions of a wheel is transmitted, i.e., a shaft to which is transmitted the rotation of a flexible shaft 21 which transmits to a speedometer a rotational motion proportional to the number of revolutions of the wheel as shown schematically in FIG. 4. Numeral 6a designates a gear which is integral with the rotary shaft 6 so that the rotation of the rotary shaft 6 is transmitted at a reduced speed to a drive gear 11 by way of the gear 6a through gears 7, 8, 9 and 10. Numerals 12, 13, 14, 15 and 16 designate disk wheels rotatably mounted on a supporting shaft 17. The disk wheels 12 through 16 and the supporting shaft 17 constitute a mileage counter or odometer of the same construction as a conventional mileage counter, and the reduction ratios are selected so that one complete rotation of the disk wheel 12, rotatable with the drive gear 11 as a unit, causes the next disk wheel 13 to rotate 36°, the disk wheel 14 is rotated 36 degrees for every complete rotation of the disk wheel 13, and the disk wheels 15 and 16 are similarly rotated in sequence causing the final stage disk wheel 16 to make one complete rotation for every 20,000 km traveled. Further, the disk wheel 16 is provided with a pair of projections 16a at diametrically opposite positions on the outer surface thereof. The detecting switch 3 is arranged so that its movable member 3a rides along the outer surface of the disk wheel 16 through a roller 3b and a contact pin 3c is moved in accordance with the displacement of the movable member 3a to open and close the contact.

With the construction described above, the first embodiment of the present invention operates as follows. Assuming now that the total distance traveled by a vehicle is less than 10,000 km, the movable member 3a of the detecting switch 3 is out of engagement with the projections 16a of the disk wheel 16 as shown in FIGS. 2 and 3 therefore the contact pin 3c is not pressed. Consequently, the contact 3d is opened and no current is supplied to the lamp thus keeping it in the off condition. On the other hand, when the total distance traveled by the vehicle exceeds 10,000 km, the movable member 3a of the detecting switch 3 is engaged with the projection 16a through the roller 3b so that it is forced upward by the projection 16a of the disk wheel 16 and the contact pin 3c is pressed to close the contact 3d. Consequently, the relay coil 4a is supplied with electric current from the battery 1 so as to energize to close the relay contact 4b and the lamp 5 is turned on to give a warning to the driver indicating that the total distance traveled has exceeded 10,000 km. In this case, if the movable member 3a of the detecting switch 3 rides over the projection 16a and comes out of the engagement therewith thus opening the contact 3d, the energization of the relay coil 4a is still maintained since the relay coil 4a is in turn supplied with the electric current through the relay contact 4b and the self-holding type relay 4 maintains its self-holding action, thus causing the lamp 5 to remain switched on. If the driver sends his vehicle for the periodic checks in answer to the warning, the repair man may operate the reset switch 2 for a short period of time so that the operation of the self-holding type relay 4 is released and the contact 4b is opened to switch the lamp 5 off.

When the vehicle has traveled another 10,000 km, the movable member 3a of the detecting switch 3 is forced upward by the second projection 16a of the disk wheel 16 so that the contact 3d is closed again and the self-holding type relay 4 is actuated. As a result, the lamp 5 is switched on again to give a warning. In other words, the lamp 5 is switched on and gives a warning every 10,000 km traveled.

Figure 5:
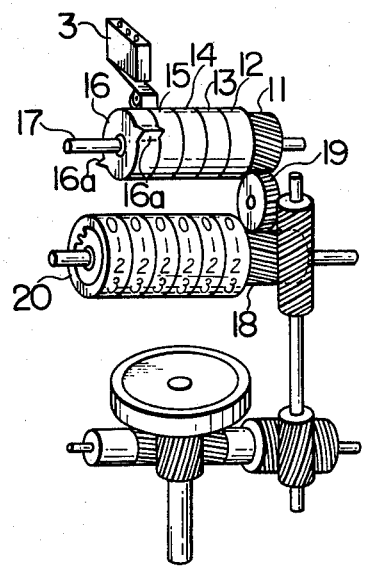
FIG. 5 is a perspective view showing another form of the mileage detector in the system according to the first embodiment.

While, in the embodiment described above, the mileage detector A is provided separately from the speedometer, it may be incorporated in the speedometer installed in a vehicle as shown in FIG. 5. In this arrangement, the rotation of a drive gear 18 of the mileage counter is transmitted through a gear 19 to the drive gear 11 of the mileage detector A. Further, if the disk wheel 16 is provided with ten projections 16a arranged on the outer surface thereof at regular intervals and if the disk wheel 16 is arranged so that it rotates in unison with the highest order figure wheel 20 (which completes one revolution every 100,000 km) of the mileage counter shown in FIG. 5, then the detecting switch 3 may be opened and closed every 10,000 km traveled. In this way, it is possible to make the maximum use of the mileage counter installed in the vehicle.

Figure 6:
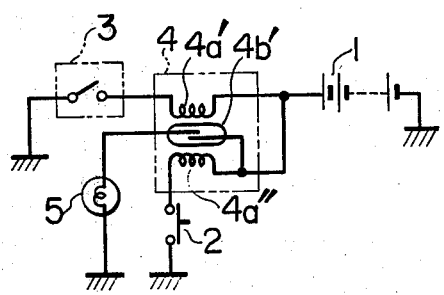
FIG. 6 is a circuit diagram showing a second embodiment of the system of this invention.
Figure 7:
FIG. 7 is a graph useful for explaining the operation of the detecting switch used in the first and second embodiments of the invention.

Further, the self-holding type relay 4 may be of the type shown in FIG. 6, which comprises a self-holding type read switch 4b' (a reed switch in which the residual magnetism of the reed member is greater than that in ordinary reed switches) and relay coils 4a' and 4a'' which are wound in the opposite directions with each other, whereby when the detecting switch 3 is closed the reed switch 4b' is closed by the relay coil 4a' and the lamp 5 is switched on. After the completion of the periodic checks on the vehicle, the normally open reset switch 2 of automatic restoring type may be closed to open the reed switch 4a' and thereby to switch the lamp 5 off.

Figure 8:
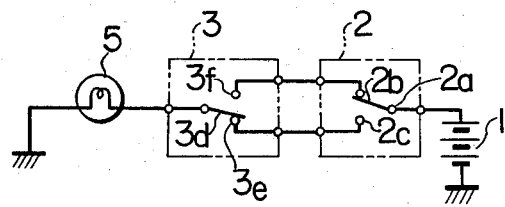
FIG. 8 is a circuit diagram showing a third embodiment of the system of the invention.

A third embodiment of the system of this invention including no self-holding type relay will now be described with reference to FIG. 8. In FIG. 8, numeral 1 designates a battery installed in a vehicle which constitutes a power source, 2 a reset switch of the single-pole double-throw type which is installed as a hidden switch on the back side of the instrument panel, in the truck or the like where it is not easily seen by the driver. Numeral 3 designates a detecting switch of the single-pole double-throw type incorporated in the mileage detector A which will be described later, 5 a lamp mounted on the instrument panel which constitutes a warning device.

Figure 4:
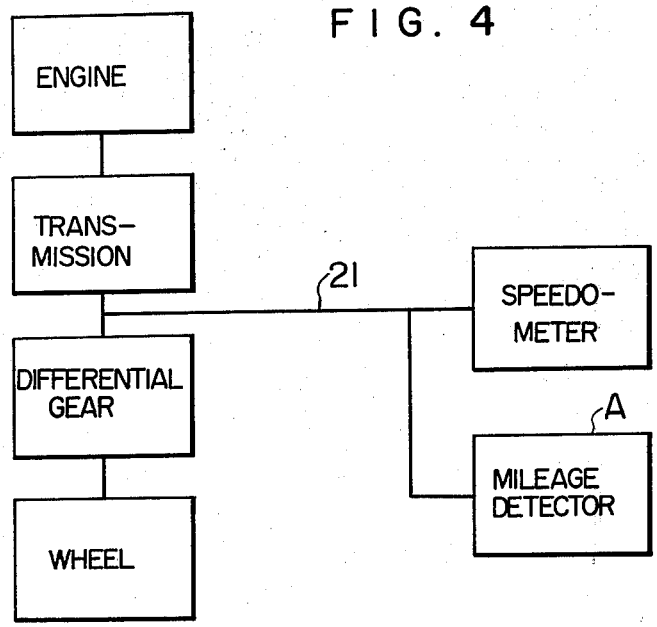
FIG. 4 is a block diagram schematically showing a rotation transmission line for the mileage detector in the system of this invention.
Figure 9:
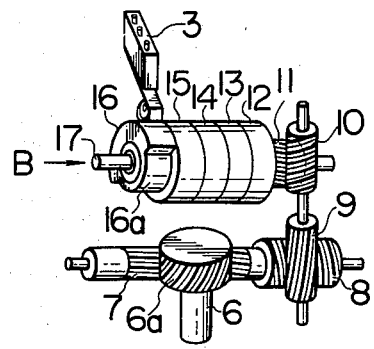
FIG. 9 is a perspective view showing the mileage detector used in the third embodiment of the system of the invention.
Figure 10:
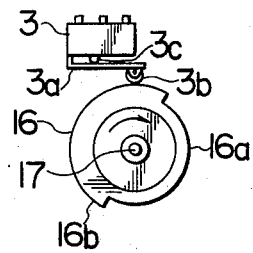
FIG. 10 is a partial side view of FIG. 9 viewed in direction of an arrow B.

The mileage detector A of the third embodiment including the detecting switch 3 of the above-mentioned type will now be described with reference to FIGS. 9 and 10, in which numeral 6 designates a rotary shaft to which is transmitted a rotational motion proportional to the number of revolutions of a wheel, i.e., a shaft to which is transmitted the rotation of a flexible shaft 21 which transmits to a speedometer a rotational motion proportional to the number of revolutions of the wheel as shown in FIG. 4. Numeral 6a designates a gear which is integral with the rotary shaft 6 so that the rotation of the rotary shaft 6 is transmitted at a reduced speed to a drive gear 11 by way of the gear 6a through gears 7, 8, 9 and 10. Numerals 12, 13, 14, 15 and 16 designate disk wheels rotatably mounted on a supporting shaft 17. The disk wheels 12 through 16 and the supporting shaft 17 constitute a mileage counter of the same construction as a conventional mileage counter, and the reduction ratios are selected so that one complete rotation of the disk wheel 12 rotatable with the drive gear 11 as a unit causes the next disk wheel 13 to rotate 36°, the disk wheel 14 is rotated 36° for every complete rotation of the disk wheel 13, and the disk wheels 15 and 16 are similarly rotated in sequence causing the final stage disk wheel 16 to make one complete rotation for every 20,000 km traveled. Further, the final stage disk wheel 16 is formed with a depression 16a which extends over one half of the entire outer periphery thereof. The detecting switch 3 is arranged so that its movable member 3a slides along the outer periphery of the disk wheel 16 through the intermediary of a roller 3b, and a contact pin 3c is pressed in accordance with the displacement of the movable member 3a to move a movable contact 3d from one stationary contact to the other.

With the construction described above, the third embodiment operates as follows. Assuming now that the distance traveled by a vehicle is less than 10,000 km, as shown in FIGS. 9 and 10, the movable member 3a of the detecting switch 3 is in sliding engagement with a high portion 16b of the disk wheel 16 and thus the contact pin 3c is pressed to engage the movable contact 3d with a stationary contact 3e as shown in FIG. 8. Consequently, no current is supplied to the lamp 5 and it is switched off. Then, when the distance traveled by the vehicle exceeds 10,000 km, the movable member 3a of the detecting switch 3 is landed on the low portion 16a of the disk wheel 16 so that the contact pin 3c returns to the initial position and the movable contact 3d comes into engagement with a stationary contact 3f. When this occurs, current is supplied to the lamp 5 by way of the detecting switch 3 and the reset switch 2 and thus the lamp 5 goes on to warn the driver indicating that the distance traveled by the vehicle has exceeded 10,000 km. If the driver sends his vehicle for the periodic checks in answer to this warning, the repair man may switch the lamp 5 off by separating a movable contact 2a of the reset switch 2 from a stationary contact 2b and closing it to a stationary contact 2c.

When the vehicle has traveled another 10,000 km, the movable member 3a of the detecting switch 3 comes out of the engagement with the low portion 16a of the disk wheel 16 and it again rides on the high portion 16b causing the movable contact 3d of the detecting switch 3 to reengage with the stationary contact 3e. Consequently, the lamp 5 is switched on and gives a warning. In other words, the lamp 5 is switched on and gives a warning every 10,000 km traveled.

Figure 11:
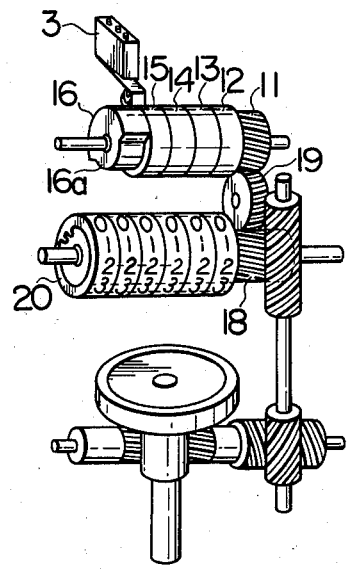
FIG. 11 is a perspective view showing still another form of the mileage detector used with the system of the invention.

While, in the third embodiment described above, the mileage detector A is provided separately from the speedometer, it may be incorporated in the speedometer installed in a vehicle as shown in FIG. 11. In this arrangement, the rotation of a drive gear 18 of the mileage counter is transmitted through a gear 19 to the drive gear 11 of the mileage detector A. Further, if the high and low portions are provided at ten equal parts on the outer periphery of the disk wheel 16 and if the disk wheel 16 is arranged so that it rotates in unison with the highest order figure wheel 20 (which completes one revolution every 10,000 km) of the mileage counter shown in FIG. 11, then the detecting switch 3 may be changed from one circuit connection to the other every 10,000 km traveled. In this way, it is possible to make maximum use of the mileage counter installed in the vehicle.

What is claimed is:

1. A mileage warning system for an automotive vehicle comprising
    a battery positioned in said vehicle,
    mileage detecting means including a detecting switch of the single pole, double throw type for moving the contact arm of the switch between a pair of fixed contacts each time the vehicle reaches a predetermined distance set by the mileage warning system,
    a reset switch means including a second pair of fixed contacts connected with said first fixed contacts of the detecting switch respectively, and
    warning means connected with said battery through said detecting means and said reset switch wherein when said predetermined distance is reached, said contact arm closes on a first fixed contact thereby connecting said battery through said reset switch and said detecting switch to energize said warning means and wherein said warning means is deenergized when said reset switch is moved from a first contact to a second.

2. A mileage warning system for an automotive vehicle in accordance with claim 1, wherein said mileage detecting means further comprises;
    disk wheel means being rotatable in accordance with a distance traveled and having a high and low portion respectively formed over selected areas of the outer surface thereof; and
    a movable contact employed in said switch means and engaging with said outer surface of said disk wheel means.

3. A mileage warning system for an automotive vehicle in accordance with claim 2, wherein said disk wheel means is rotated in proportion to the number of revolutions of a wheel by means of a flexible cable adapted to transmit said number of revolutions to a speedometer.

4. A mileage warning system for an automotive vehicle in accordance with claim 2, wherein said disk wheel means is rotated through a rotation transmission line for a mileage counter incorporated in said speedometer.

* * * * *